United States Patent [19]

Klinkel et al.

[11] Patent Number: 4,757,668

[45] Date of Patent: Jul. 19, 1988

[54] METHOD AND APPARATUS FOR FORM-FILL-SEAL PACKAGING OF ARTICLES

[75] Inventors: Wolfgang Klinkel, Bigorio, Switzerland; Dieter Vits, Neuss, Fed. Rep. of Germany

[73] Assignee: ILAPAK Research & Development S.A., Grancia-Lugano, Switzerland

[21] Appl. No.: 6,623

[22] Filed: Jan. 22, 1987

[30] Foreign Application Priority Data

Jan. 27, 1986 [CH] Switzerland .................. 304/86
Jul. 31, 1986 [CH] Switzerland .................. 3079/86

[51] Int. Cl.⁴ .......................... B65B 9/08; B65B 9/10
[52] U.S. Cl. .................................. 53/451; 53/551; 53/373
[58] Field of Search .................. 53/551, 552, 373, 552

[56] References Cited

U.S. PATENT DOCUMENTS

| | | | |
|---|---|---|---|
| 2,915,866 | 12/1959 | Bartlo | 53/552 X |
| 3,779,836 | 12/1973 | Henry et al. | 53/551 X |
| 4,128,985 | 12/1978 | Simmons | 53/51 |
| 4,288,965 | 9/1981 | James | 53/551 X |
| 4,295,922 | 10/1981 | Evers | 53/373 X |
| 4,391,081 | 7/1983 | Kovacs | |
| 4,525,977 | 7/1985 | Matt | 53/550 X |
| 4,532,753 | 8/1985 | Kovacs | 53/551 X |
| 4,549,386 | 10/1985 | Wilson | 53/51 |
| 4,563,862 | 1/1986 | McElvy | 53/552 |

Primary Examiner—Horace M. Culver
Attorney, Agent, or Firm—Frishauf, Holtz, Goodman & Woodward

[57] ABSTRACT

To provide for continuous feed of a packaging film, the film into a tube, filling the tube into packages and severing the packages, markers are located longitudinally along the film for example of plastic; the film is fed and formed into a tube by a pulling mechanism, the drive of which is synchronized with the bag-forming operation as such, that is, sealing and severing tube portions, under control of the markers so that slippage between drive rollers or units and the film being fed or inaccuracies in operation of the filling mechanism are immediately compensated by change in speed of the drive unit or operation of the filling and bag-forming mechanism to maintain relative alignment of bag closing with respective areas on the film, preventing accumulation of positioning errors and hence possible misalignment of printed information on the film with respect to the closing seams of the bag.

22 Claims, 13 Drawing Sheets

METHOD AND APPARATUS FOR FORM-FILL-SEAL PACKAGING OF ARTICLES

Reference to related patents, the disclosure of which is hereby incorporated by reference: U.S. Pat. No. 4,288,965, James, Sept. 15, 1981. U.S. Pat. No. 4,391,081, Kovacs, July 5, 1983.

Reference to related applications, assigned to the assignee of the present application, the disclosure of which is hereby incorporated by reference: U.S. Ser. No. 06/830,641, filed Feb. 18, 1986, KLINKEL now U.S. Pat. No. 4,713,047, of Dec. 15, 1987.

The present invention relates to packaging materials in flexible bags, typically plastic bags, which are made as the product is being filled into the bags by supplying a web of plastic film to a former which shapes the web into a tube which is then sealed longitudinally, filled, and sealed transversely.

BACKGROUND

Form-fill-seal packaging of articles is known; the usual way is to provide a film of plastic material, passing the film around a former to wrap the film longitudinally, for example about a mandrel, tube or the like, to form a tubular structure with a vertical seal. The tubular structure is cross-sealed by a cross-sealing apparatus, for example by welding, adhesion or the like, usually under heat, by passing the tube between a pair of heated sealing jaws. The tube is filled, and the sealing jaws, at the same time, seal above the filled tube portion to close the tube while forming a second seal, even higher, as the bottom for the next succeeding package. The tube is severed, and the now sealed package can be discharged in a bin. Processes and apparatus to form-fill-seal packaging apparatus as previously known operate intermittently. In such systems and apparatus, a web of film is drawn off a supply roll, the length of the web corresponding to the required length of the package. Upon forming the film into a tube, the longitudinal and transverse seals are made, while a film portion which will form the package is stationary. Such intermittent operation places stress on the transport of the film which is moved, in steps. The film web is, thus, undesirably differentially stressed, the production output is limited and web guiding problems are existing.

THE INVENTION

It is an object to provide a form-fill-seal packaging apparatus and method which operates continuously, in other words, which permits continuous manufacture of sealed and filled packages which have a higher output than previously known apparatus. Film is saved because of low speed and continuous web guiding. Ready change of the length of the packages is permitted and occurance of cumulative feed errors is avoided. This is particularly important if the packages have printed information thereon so that, when the packages are finally supplied, the printed information or advertising material or the like will fall between the seamed ends, where it is desired.

Briefly, spaced markers are placed on the film, and the film is continuously positively fed to the tube former. A pulling force is continuously exerted on the tube which is longitudinally seamed. The spaced markers on the film are scanned, for example optically, and the length between the spaced markers is compared with a predetermined command length, for example by comparing the time between the occurance of spaced markers as the film is being fed with predetermined speed. The time intervals or time periods can readily be determined by counting of clock pulses or signals of a computer apparatus. The feeding speed of the film supply is then controlled, in synchronized relations, with the operation of the cross-sealing element, as well as with a sealing drive unit which, continuously, moves the sealing jaws downwardly as the form-fill-seal packaged articles is being moved under prior control of the film feeding element. By comparing the scanned length—or time—between markers with a command length, or command time, respectively, a deviation can be determined and the feeding speeds controlled to compensate for any deviation which may be found, so that the feeding speeds, sealing speeds and filling speeds can all be matched to each other.

The system and method has the advantage that all necessary operations, such as forming of a longitudinal film seal or overlap seal, filling of the product in the interior of the formed bag, generation of cross seams or seals, and severing of the filled packages can be carried out as a continuous process and during continuous supply of the film from a film supply, such as a film supply reel.

The continuous feed of the film, and hence of the formed tube, can easily be obtained by drawing the formed tube downwardly, together with the sealing jaws, synchronously with draw down rollers, so that back-up of filled articles or filled goods into the bags will be avoided. Thus, the packaging material usage can be decreased and, further, printed subject matter on the packages will always appear at the same relative position with respect to cross seals, and in accordance with the desired alignment. Errors in positioning of the seals, for example with respect to printed subject matter, are readily avoided, and will not become cumulative. Moving the sealing elements with the film results in extended dwell time against the film and consequent excellent seals.

Other objects, features and advantages will appear herein-after as the description proceeds.

DRAWINGS

Figure 5:
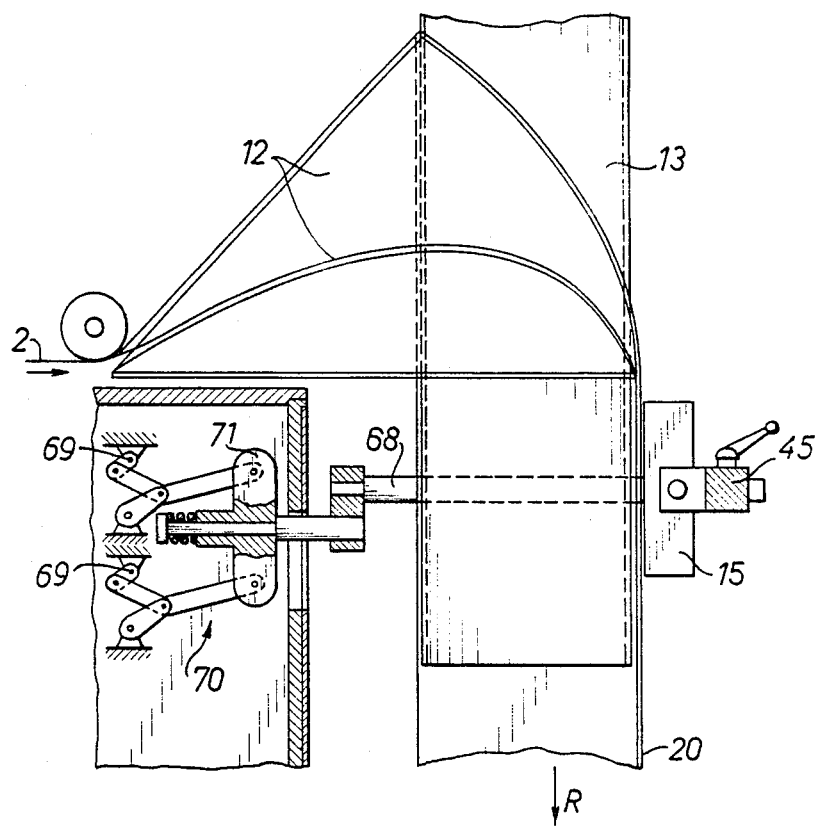
FIG. 5 is a side view of the drive for the longitudinal or tube sealing jaw.
Figure 16:
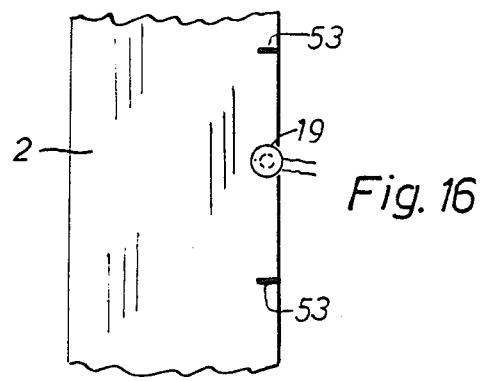
Figure 11:
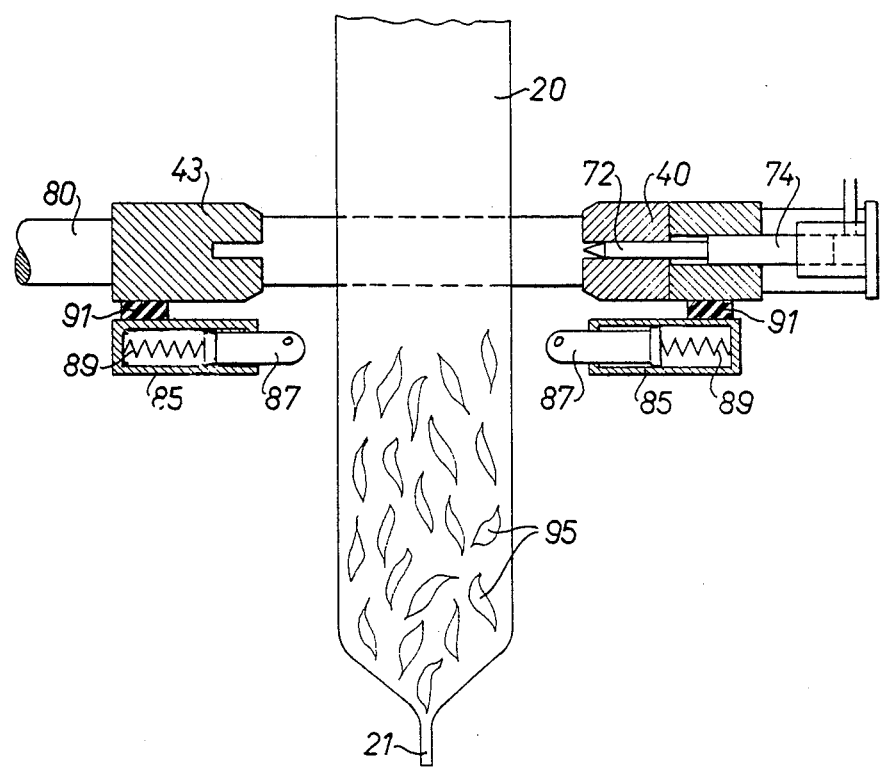
Figure 12:
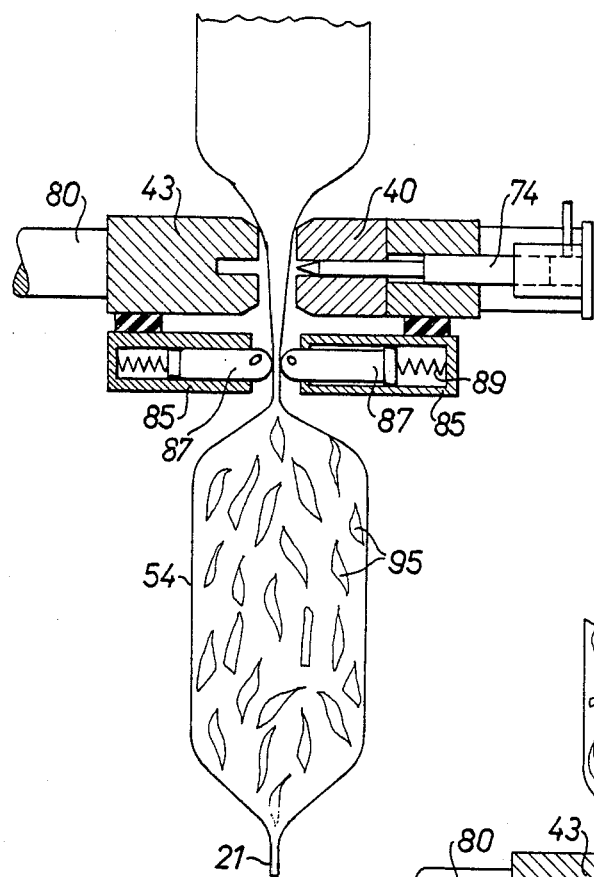
Figure 13:
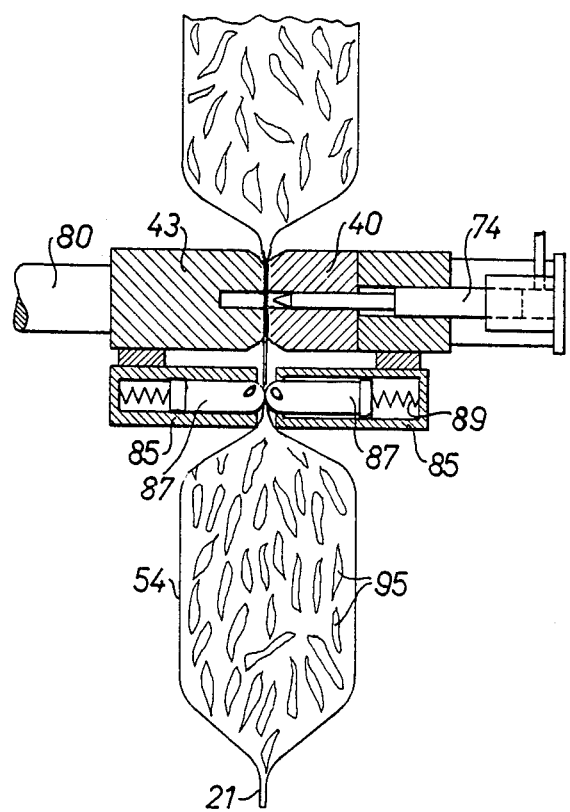
Figures 14, 15:
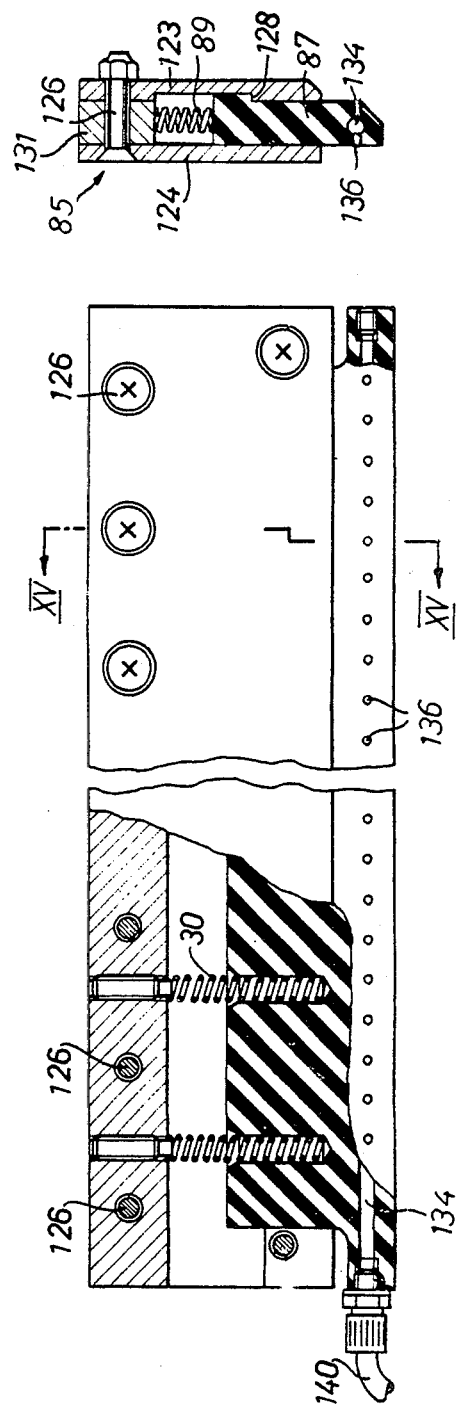
Figure 17:
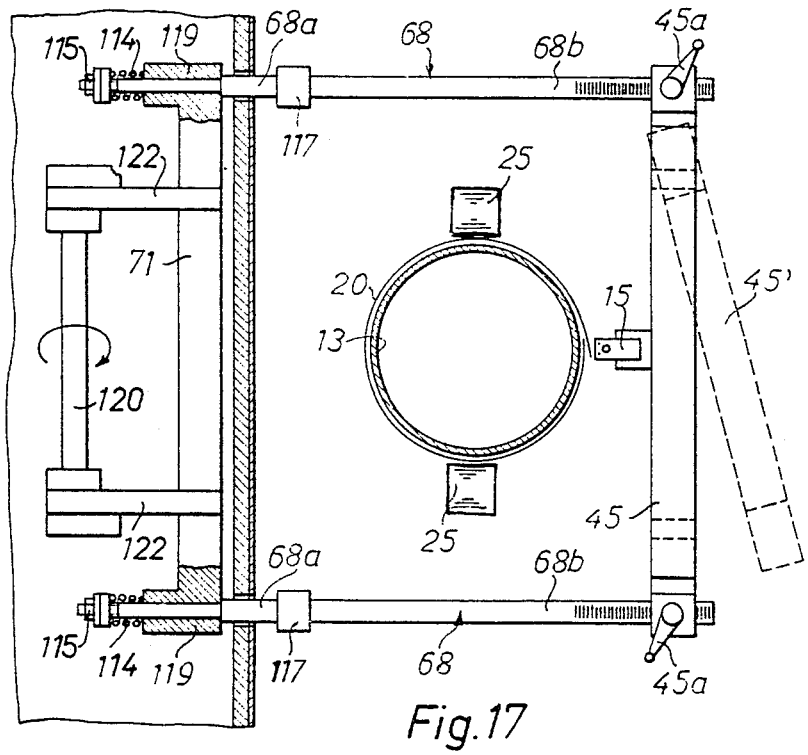
Figure 19:
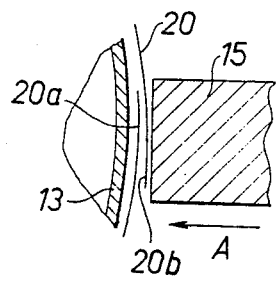
Figure 20:
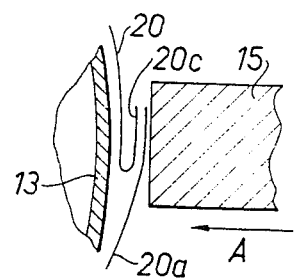
Figure 18:
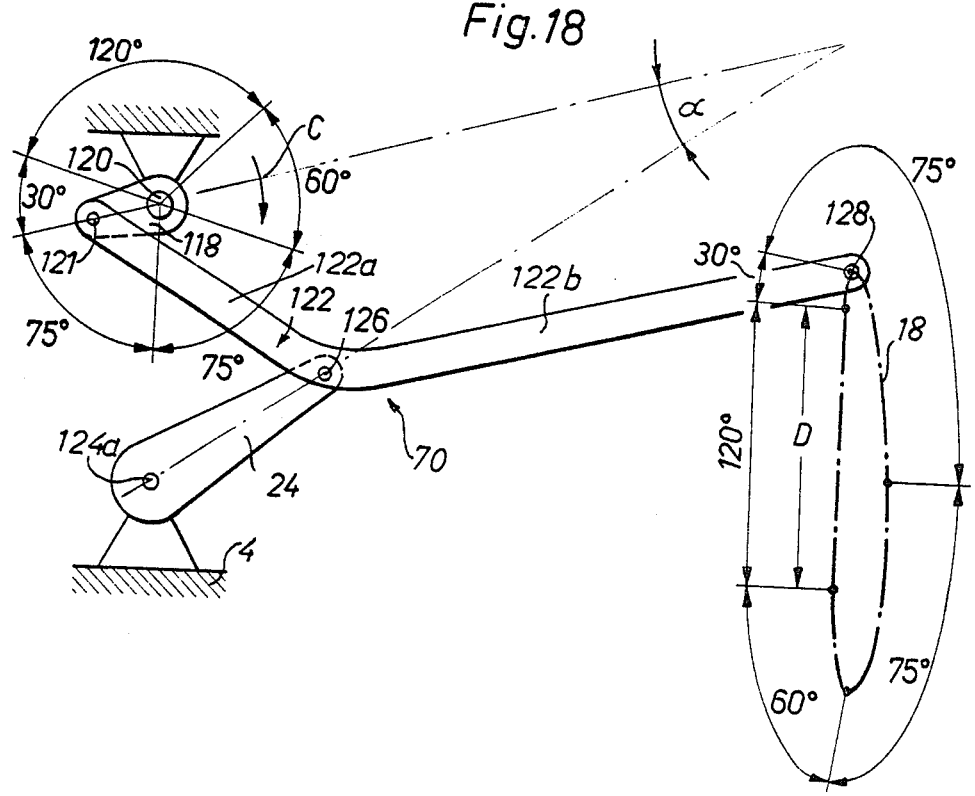

FIG. 11 illustration of the cross-sealing or cross-welding jaws in open position;

FIG. 12 is an illustration of the cross-sealing or cross-welding jaws in position just prior to sealing;

FIG. 13 is an illustration similar to FIG. 12 during sealing;

FIG. 14 is a plan view of a stripper plate;

FIG. 15 is a sectional view of the stripper plate shown in FIG. 14;

FIG. 16 is a plan view of the film at the position where it passes a sensor and illustrating register marks on the film;

FIG. 17 is a horizontal sectional view through the longitudinal seal-welding apparatus shown in FIG. 5;

FIG. 18 is a schematic view illustrating the coupling linkage drive;

FIG. 19 is a fragmentary horizontal view through the longitudinal sealing jaw, and illustrating the position of the overlapping end portions of the film as a longitudinal overlap-seal is being formed; and FIG. 20 is a fragmentary horizontal view through the longitudinal sealing jaw, and illustrating the position of the overlapping end portions of the film for forming a finseal.

DETAILED DESCRIPTION

Figure 1:
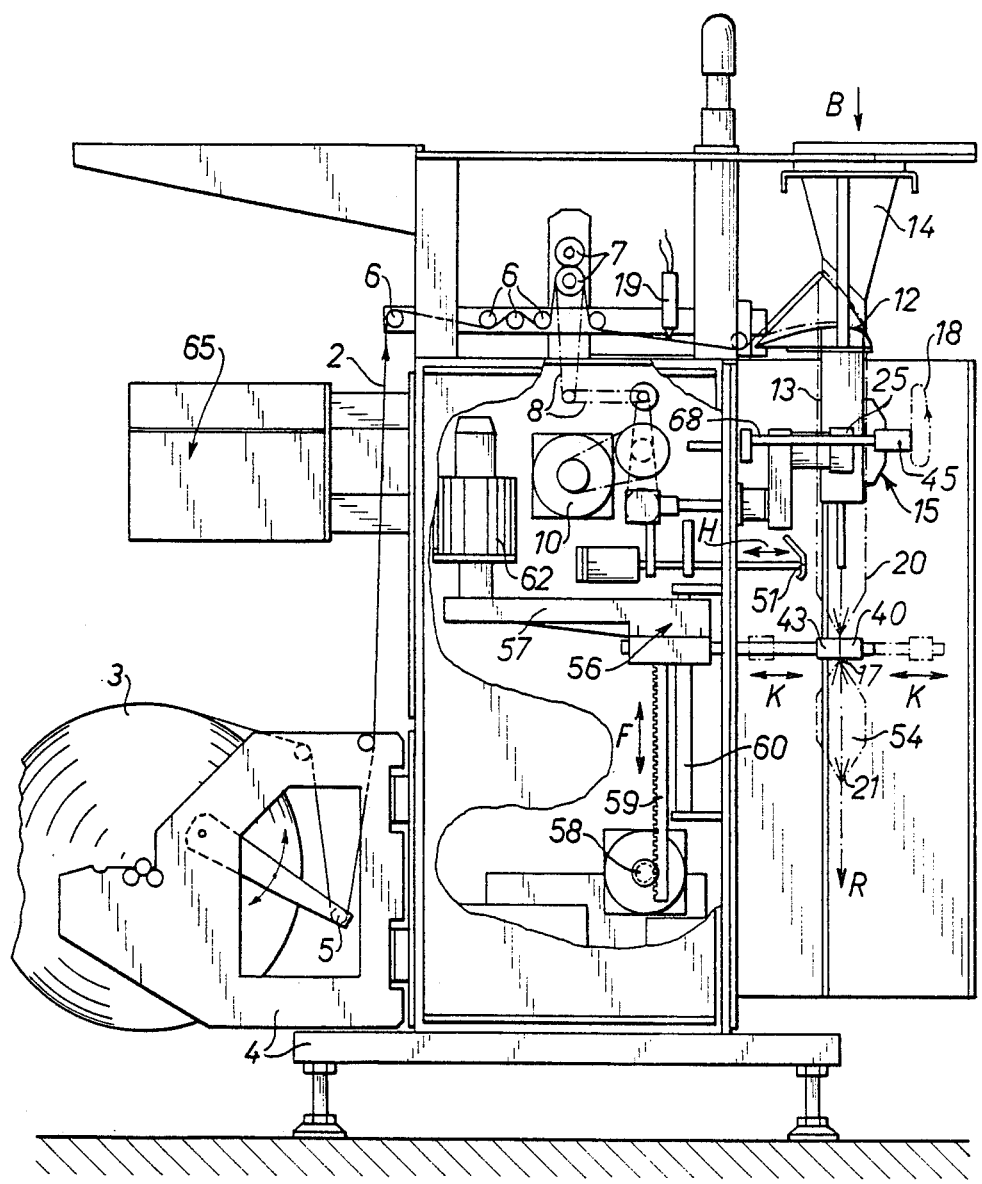
FIG. 1 is a general side view of a form-filling and sealing packaging machine, omitting elements not necessary for an understanding of the invention, and designed for vertical installation, for example fill in downward direction.
Figure 2:
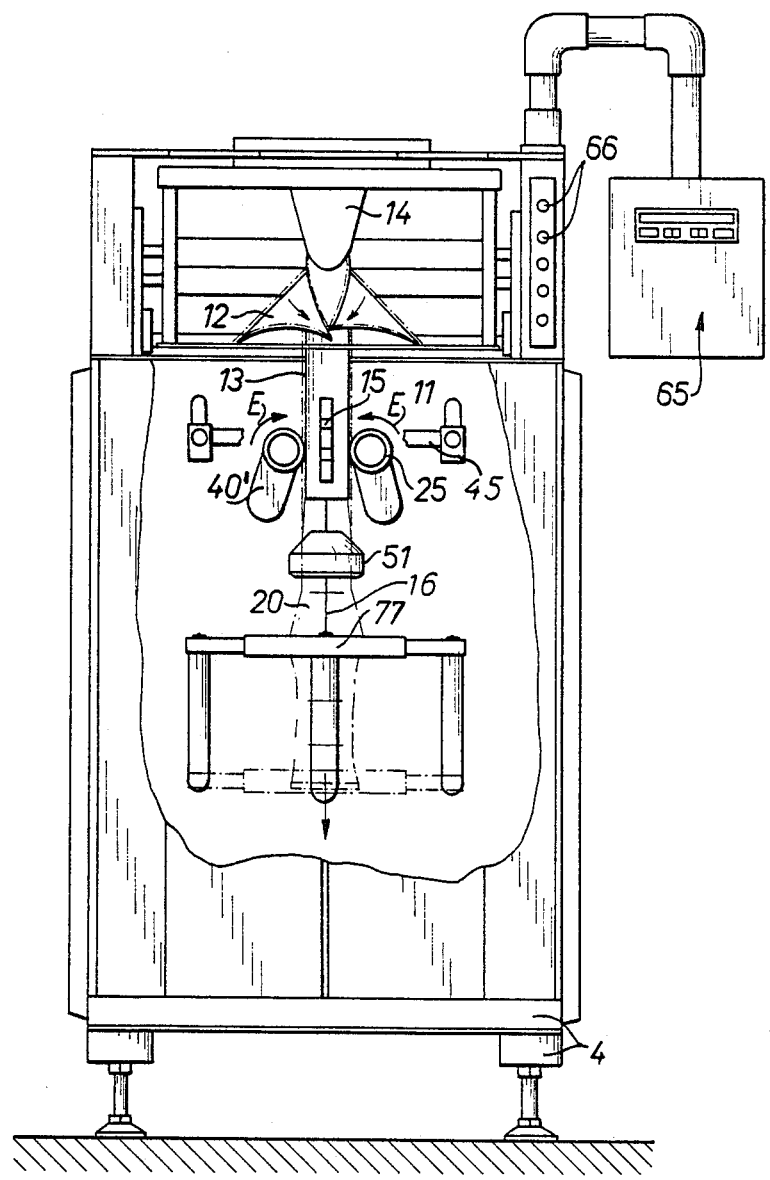
FIG. 2 is a front view of the apparatus, partly cut away.

The form-fill-seal packaging apparatus—see FIGS. 1 and 2—is used, primarily, to fill a tubular bag formed from a flat, flexible film 2. The flat film 2 is, typically, a flat, flexible plastic foil web or film, for example heat-sealable polypropylene, weldable polyethylene or the like. The film 2 is drawn off a supply reel 3. The supply reel 3 is located on a machine frame 4, on suitable bearings, to be supplied as needed. A dancer compensating roller arm 5, known as such, is pivotally suppored on the frame to form a variable film supply loop. The supply reel 3 is cooperating with a proportional acting brake. Idler roller 5 may be under forced tension and/or form the supply loop by its own weight. The film 2 is then guided over a plurality of deflection rollers 6 to a pair of drive rollers 7. The drive rollers 7 are driven by suitable sprocket chains or other similar drives from a motor 10 which, preferably, is a servo motor or a stepping motor so that its speed can be accurately controlled. The drive roller pair 7 thus draws the film web 2 from the film reel 3 and supplies the film web 2 to the apparatus downstream of the drive roller pair 7.

The film web 2 is guided over a former 12, of known and standard construction, to be formed into a longitudinally, vertically directed tube 20 surrounding a filling tube 13 on the outside thereof. Preferably, the filling tube 13 is cylindrical and of circual cross section. The upper end of filling tube 13 is in communication with a fill funnel 14. Products introduced into the funnel 14 in the direction of the arrow B (FIG. 1) can be filled within packages to be formed; a predetermined quantity, by weight, volume, number or the like, in accordance with well known proportioning apparatus, will provide the charge of the products to be filled into the respective packages. Frequently, the charge to be filled into the packages may be determined by weight. Filling arrangements other than the fill funnel 14 as shown may be used.

The tube 13 is cut longitudinally on the back side thereof up to close to the upper edge of the shoulder of the former 12, so that contact of the fill charges with the continuously moving film will occur early, and the fill charge thus is carried along by the continuously moving film, which may prevent bridging and which draw the product down by the film speed.

FIGS. 19 and 20 show the vertical edge region 20a, 20b, 20c, of the tube 20 which is formed by the former, and that these edge regions 20a, 20b, 20c overlap or are forming a finseal. A longitudinal seal jaw or apparatus 15—shown in greater detail in FIG. 5 and FIGS. 19 and 20—forms a longitudinal seal or weld 16. The longitudinal connection apparatus, which can be a welding or sealing apparatus, is movable vertically as a unit. The sealing operation is carried out continuously during continuous feed of the web 2 and the then formed tube 20. The longitudinal sealing jaw or other sealing or welding apparatus 15 carries out a movement which is shown by curve 18, in chain-dotted lines in FIG. 1. During the sealing process—in which a vertical, linear seal is generated—the sealing element 15 moves continuously and with the same speed as tube 20 in accordance with the downwardly directed movement, see arrow R of FIG. 1. At the end of the stroke, and as the longitudinal seal 16 has been formed at the circumference of the tube 20, the jaw 15 is lifted off the tube 20, and returned upwardly while keeping some radial distance from the tube 20. The upward movement is about three times faster than the downward movement of the tube 20. Since the jaw 15 has a definite length dimension in longitudinal direction, a continuous seal can be formed. The length of the jaw 15 and the vertical movement is shorter than the vertical seal of a package 54 (FIG. 1), thus providing for compact size of the machine. Such compact size of the machine allows a low height of drop for the product and enables to reach a higher output. The vertical seal made by the jaw 15 overlap to form a continuous verticalla seal. The overlapping area is preferably about 10 mm. Movement of the jaw 15 is generated by a multiple bar linkage drive.

FIG. 5 shows an embodiment of a bar linkage drive 70 for the jaw 15. A connecting bar 71 supports two parallel rods 68—see also FIG. 17—which, in turn, carries the sealing jaw 15. The parallel rod 68, connecting bar 71 and the jaw 15, as well as a cross bar 45 supporting the jaw 15, carry out an approximately elliptical movement—see curve 18, FIG. 1—in which the vertial downward movement is practically linear and the speed of the seal jaw 15 synchronous to the speed of the film. The sealing jaw 15 engages the tube edge portions 20a, 20b, 20c to form the sealed tube 20 during the downward movement. The motor 10 is coupled to a pair of shafts 69 (FIG. 5) so that the movement of the sealing jaw 15 will occur in synchronism or synchronized relationship with the feed movement of the film 2, and hence of the tube 20. The drive of the motor 10, thus, which is coupled to the drive roller pair 7 and to movement of the welding jaws 15, insures that the sealing jaw 15 and the feed of the film 2 and hence of the tube 20 will be in step and in synchronism.

Rather than using a multiple bar linkage as shown in FIG. 18, it is also possible to use other arrangements, for example by moving the longitudinal jaw 15 by different drive elements, for example cams.

The details of the longitudinal drive elements are best seen in FIGS. 17 and 18: The jaw 15 is secured to the cross element 45 which, in turn, is connected with its ends to the two rods 68. The jaw 15 and the seal to be formed on the tube 20 should be accessible and, to provide ready adjustment, the cross bar or carrier 45 is constructed to be movable, so that it can be swung out of the full-line position into the broken-line position shown at 45'. The end of the rod 68 remote from the cross brace 45 is supported in a support carrier 71 which, in turn, is connected with two parallel coupling drives 70 (FIGS. 5 and 18). A spring, for example in form of a compression spring 114, is located between the rear end of the rod 68 and the carrier 71, providing engagement pressure to the sealing jaw 15 on the feeding tube 13, with the tube edge portions 20a, 20b, 20c interposed. The pressure can be adjusted by turning nuts 115 on threaded end portions of the rods 68. For ease of mounting, and to provide for adjustment and alignment arrangement, the rods 68 are subdivided into a forward and rearward portion 68a, 68b, respectively, coupled by coupling elements 117. The rod portion 68a, in turn, is secured to or terminates in ends 119 which, at least at their remote terminal, are threaded.

The two coupling drives 70 control and cause movement of the jaw 15 when the crank 118 (FIG. 18) is driven; when the lower region of the downward movement is reached, the welding jaw will lift off the tube 20 and, after an upward movement, will return to the starting or initial position, thereby carrying out the movement shown in chain-dotted representation in FIGS. 1 and 18.

The crank 118 is rotatable in the direction of the arrow C (FIG. 18) upon rotation of the shaft stub 120 which forms the end of the shaft 69 (FIG. 5). A double-armed swing lever 122 is pivotably linked to the crank 118 at a pivot point 121. The lever 122 has an intermediate link pivot point 126. The pivot point 126 is pivotably connected to a link 124, the second end of which is connected to a fixed point on the frame 4 of the machine, as shown by the pivot 124a. In accordance with a feature of the invention, the dimensions and angles of the drive 70 are so arranged that the pivot point 128 carries out an effectively or substantially constant straight-line movement over the region D (FIG. 18). To arrive a controlled motion on pivot point 128 in accordance with the drawing the levers are in a defined relation in length and angles to each other. The relationships of the lengths of the lever arms are as follows:

Assuming the crank 118 to have a length of unity or one, the following relationships pertain:
crank 118=1
link 124=3
double-armed lever portion 112a, between pivots 121 and 126=4
double-armed lever portion 112b, between pivots 126 and 126=8
overall length of the lever 122=12. At the loop position the angle $\alpha$ between lines r and s is 15°–25° preferably about 20°.

The circular movement of the crank 118 and hence the angles associated with the curve 18 are all shown in FIG. 18. After passing the straight stretch D, the jaw 15 is lifted out of engagement with the tube 13 and moved back into the initial position. The drive of the shaft 120 and the drive of the tube draw down roller system 25 (FIG. 1) as well as of the drive roller pair 7 is synchronous, that is, the downward movement of the jaw 15, at least in the region of the straight or substantially straight movement D, are all carried out with the same linear speed. Any inaccuracies in the engagement pressure of the jaw 15 against the tube 20 can be accepted by the respective springs 114 (FIG. 17). The cross element 45 can be adjusted on the rod portion 68b by hand-operated clams 45a so that fill tubes of different diameter can be accepted and, further, access to the seaming area of the tume 20 is readily possible. Two draw down rollers 25 are located diametrically opposite each other with respect to the fill tube 13 to provide for gentle draw down of the tube 20 over the former 12 and along the tube 13. The draw down rollers 25 are driven at a speed which is higher than that of the drive roller pair 7 provided from motor 10.

Thus, some slippage will result. This slippage should not occur, however, entirely between the film and the rollers 25. To accomodate the slippage, a slip coupling 22 (FIG. 6) is interposed between the drive to the rollers 25 and the drive mechanism for the draw down rollers 25.

Figure 6:
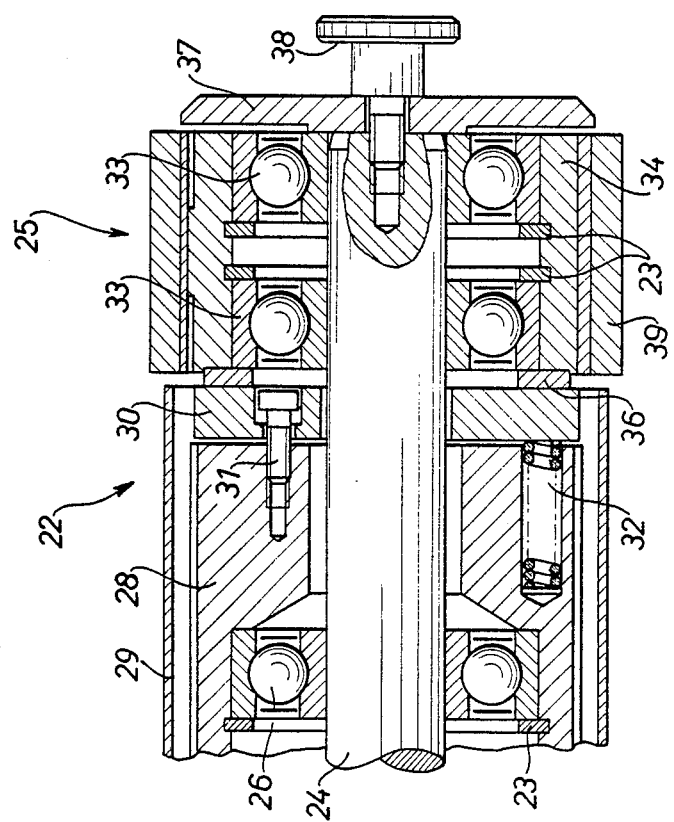
FIG. 6 is a sectional view through a draw down roller with a slip coupling.

Referring first to FIG. 6, which is a cross-sectional view of the slip coupling: A stationary shaft 24 supports a pully 28 via a ball bearing 26. The pully 28 is surrounded by a stationary tube cover 29. A disk 30, made of hardened metal, is located at the inner facing surface of the pully 28. Disk 30 is secured by screws 31 to the pully 28 to rotate therewith, and is axially pressed outwardly away from the pully 28 by springs 32. A friction disk or friction ring 36 is located on a ring structure 34 which is rotatably secured to rotate about the fixed shaft 24 by ball bearings 33. A disk 37, retained by a screw 38, pressed against the inner race of the axially outer ball bearing 33. The jacket 39 of the roller is made of a material with a high coefficient of friction.

Figure 3:
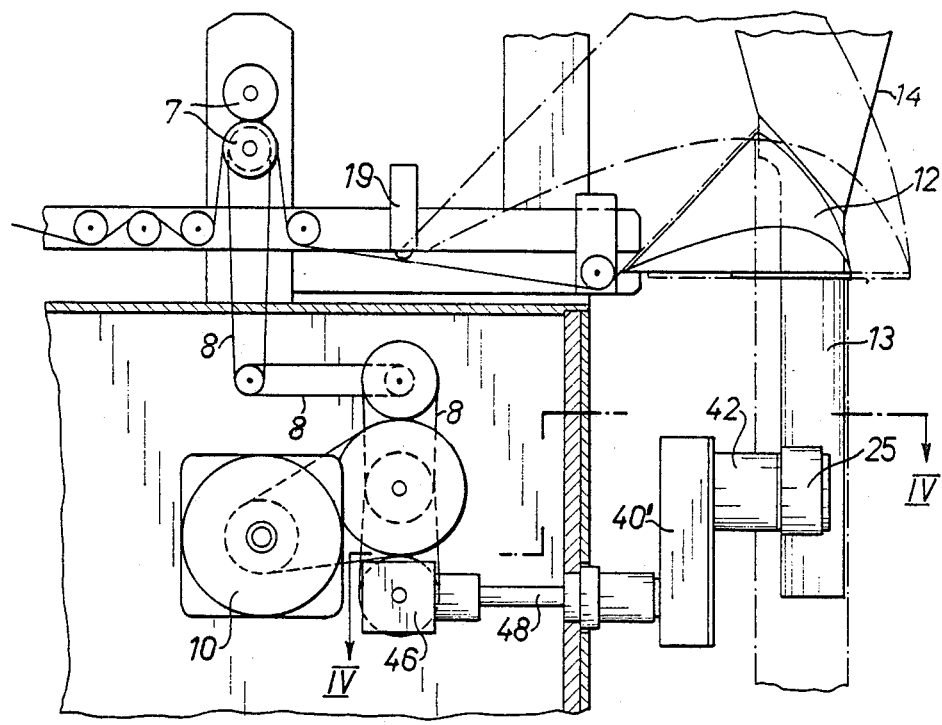
FIG. 3 is an enlarged fragmentary view of the drive for the film as it is being formed into a tube.
Figure 4:
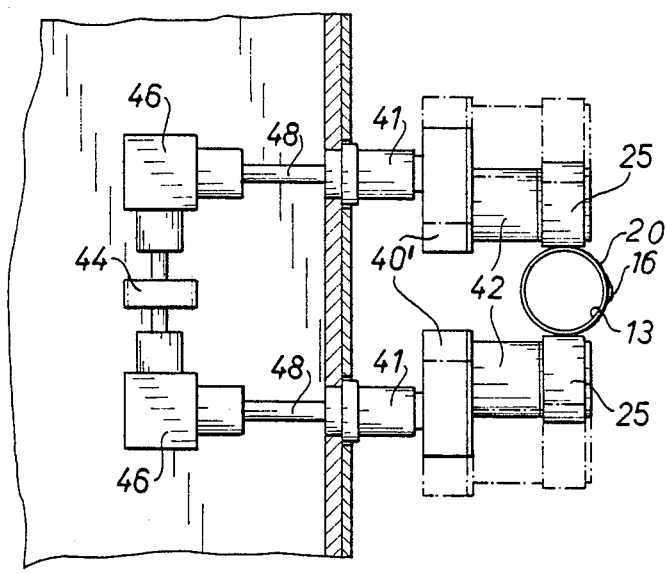
FIG. 4 is a section along the broken section line IV—IV of FIG. 3;.

Each one of the draw down roller sleeves are made of high wear resistant material—see FIGS. 3, 4—are engaged against the tube 20, wrapped about the tube 13. The rollers 25 have the tendency to rotate with higher circumferential speed than the feed of the tubes and, consequently, slip will occur between the hardened disk 30 and the friction disk of ring 36 inside of the rollers. By respectively tightening of loosening screw 38, which controls the friction between the outwardly pressed hardened disk 13 and the friction ring 36.

A plurality of screws 31 and springs 32 are located circumferentially about the fixed shaft 28 to provide for balanced placement of the disk 30, as well known.

Each one of the shafts 24 is secured to an arm 40' (FIGS. 3, 4) rotatable or pivotable about a horizontal axis. It is pressed by air piston action, not shown, radially inwardly to engage the roller 25 against the tube 20. To provide for easy exchange or refeeding of film, the rollers 25 can be pivoted away from engagement with the fill tube 13, as shown in chain-dotted representation in FIG. 4. Drive of the rollers 25 is obtained from the same motor 10 which also drives the drive roller pair 7. Transmission of rotation to the drive rollers 25 is obtained, for example, via a gear 44, to angle drives 46 and drive shafts which are coupled by an internal drive, within the arms 40', to the pully 28.

A cross-sealing apparatus is located beneath the longitudinal sealing apparatus and beneath the range of movement of the jaw 15. The cross-sealing apparatus is formed of two jaws 40, 43 (FIGS. 7, 8) which, simultaneously, form a bottom seal for a new bag, as well as a top seal for an already filled upper bag 54 (FIG. 1). The upper top seal 17 (FIG. 1) thus is formed simultaneously with the closing seal 21 for the previously filled and still open tube, so that the initially completely open tube is sealed twice by two parallel spaced seals. As best seen in FIG. 8, a severing knife 72 is provided to separate the material of the tube 20 between the two seals, to thereby separate the filled bag from the tube which has been supplied with a bottom seal.

In accordance with a feature of the invention, and since the feed of the tube 20 is continuous, the welding jaws 40, 43 and all cooperating elements, such as the knife 72, move continuously during the sealing process, and with the same feeding speed as the tube feed speed.

A vertical system 56 (FIG. 1) is provided, supporting the jaws 40, 43, and moving the jaws up and down in accordance with the double arrow F (FIG. 1). Drive motor 58 is coupled to a rack 59 which is driven by a pinion of the motor shaft 58, engaged with a vertical guide 60. Alternatively, the rack can be formed as a spindle 59a (FIG. 9) on which a spindle nut 61a is located. Depending on the direction of rotation of motor 58, the system 56 is moved vertically upwardly or downwardly. The system 56 includes a motor 62 (FIGS. 1, 8, 9) which drives a cam disk 76 over a suitable reduction gearing 62a; (see FIG. 8). The cam disk 76 is engaged by a cam follower 82 which controls the opening and closing movement of the jaw 43. Jaw 40 is moved in opposite direction by counteroperating members. The cam follower 82 engages the cam disk 76 which is coupled to the shaft 78. The cam follower 82 is coupled to the rod 80, at the end of which the welding jaw 43 is located. Upon rotation of the cam disk 76, jaw 43 will move in the direction of the double arrow K of FIG. 8. The various steps in the movement are shown in FIGS. 11 to 13. The synchronously but oppositely directed movement of the jaw 40 is controlled from the same cam disk 76 (see FIG. 7) by a member 102, fixed with the rod 80 by a bolt 105. At each end of the member 102 arms 100 are connected by link connections 104. Levers 99 are coupled with the end of the arms 100. The levers 99 are pivotable about a fulcrum 108. The outer end of each lever 99 is connected by a further link 104 with a first rod 101. Second rods 97 are coupled by links 110 with the first rods and guided in guide sleeve 98. Both second rods 97 are supporting a cross bar 77, connected with the jaw 40 and a casing 75 for the cutting apparatus. A spring 79 pushes against the member 102.

Figure 7:
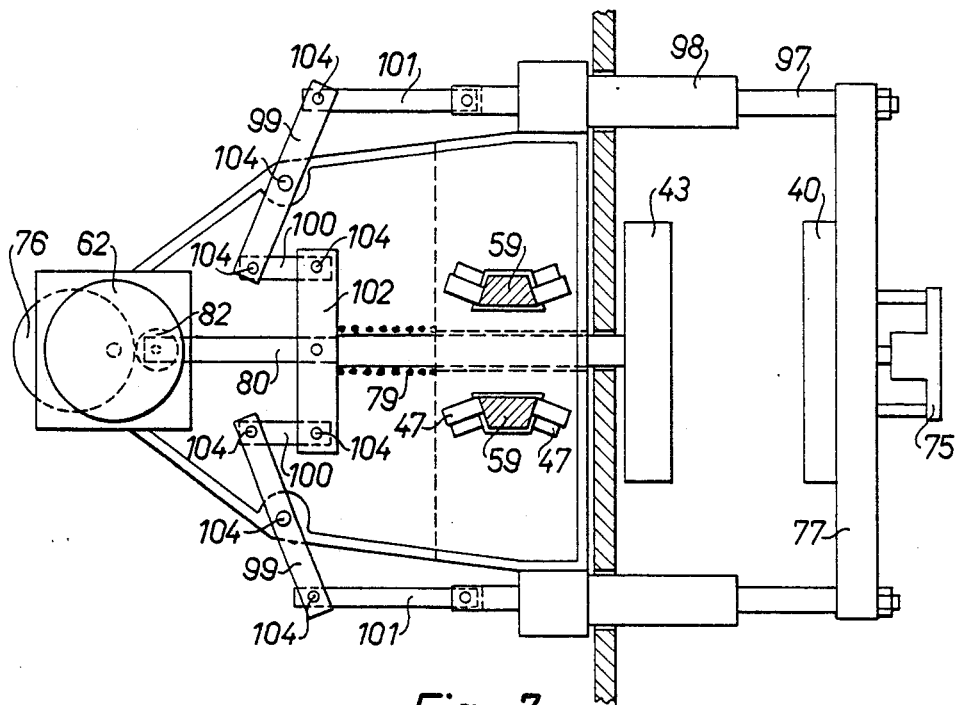
FIG. 7 is a plan view of the drive of the cross-sealing jaws for moving the jaws in opposite direction.
Figure 8:
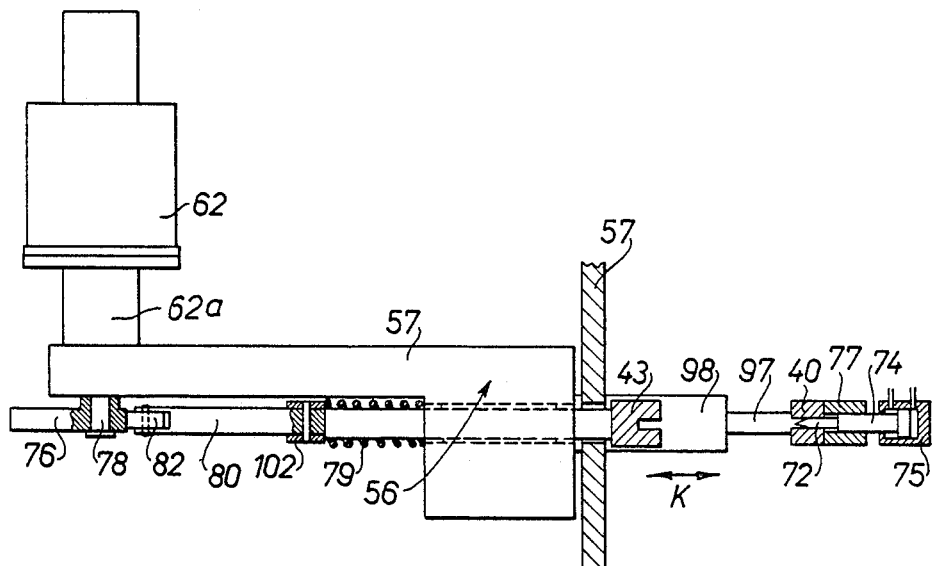
FIG. 8 is a fragmentary, part-sectional view through the drive of the cross-sealing jaw.

A cutter 72 is located centrally within the jaw 40—see FIGS. 7 and 8—which is guided in a casing 77 and operated by a cylindrical end portion 74, subjected to hydraulic or pneumatic fluid pressure, when the filled and closed bag 54 should be severed from the tube. The two jaws 40, 43 have upper and lower portions—see FIGS. 1 and 8—which are heated electrically to sealing or welding temperatures, respectively, and to form, simultaneously, with the upper portion of the jaw 43 a bottom seal of the tube 20 and, with the lower portion of the jaw 43, a top seal for the already filled bag 54. The tube portions of the jaws 40, 43 are spaced from each other, so that the closing to seal 17 (FIG. 1) of the already filled bag 54 is generated simultaneously with the bottom seal 21.

Sealing and severing structures are known, and may be in accordance with any suitable construction. A perferred structure, which also provides for control of the sealing pressure, is described in U.S. Ser. No. 96/830,641, filed Feb. 18, 1986, KLINKEL (claiming priority Swiss Application 738/85).

In accordance with a feature of the invention, the tube 20 is fed continuously. In synchronism therewith, the entire system 56 is fed at the same tube feed speed in the direction of the arrow R (FIG. 5) downwardly, as the long seal is being made. The sealing jaws 40, 43 are closed at the upper end position of the system 56—see FIG. 1—and thus, during the sealing process, the closed sealing jaws 40, 43 move with the feed speed of the tube 20 downwardly. At the same time, the goods to be packaged are filled through the fill funnel 14 into the interior of the fill tube 13, and, in measured quantity, are supplied to the tube 20 as it moves downwardly and along the fill tube 13. Before the lower end position of the system 56 is reached, and during downward travel, severing knife 72 (FIG. 8) will be operated, so that the finished and closed bag 54 will fall in the direction of the arrow R (FIG. 1) to be discharged. The pulse to operate the severing knife 72 can be provided after the sealing jaws 40, 43 have closed, with some time delay, that is, based on timing of the operation of the sealing jaws the seal itself, or as a function of the position of the system 56 along the height of the apparatus. Admission of pressure fluid to operate the knife 72 can be controlled electrically or by a cam or the like, as desired.

When the system 56 has reached the bottom position, jaws 40, 43 open based on suitable rotation of the cam disk 76, or a crank of other control apparatus. The direction of rotation of the drive motor then is reversed and its upward speed is increased, so that the system 56 is again moved to the starting position.

Rather than operation the jaws 40, 43 by a crank or by a cam disk 76, hydraulic or pneumatic cylinder-piston units can be used controlled, for example, by electromagnetic valves.

To compress contents within the tube 20 which may be of light weight, such as potato chips, and high bulk, it is desirable to shake the sides of the bag laterally by a shaker arm 51 which osciallates horizontally, as shown by the double arrow H (FIG. 1).

In accordance with a feature of the invention—see FIGS. 11-13—a precompression of the bag may be desirable if the fill goods 95 (FIG. 11), by example chips, have a tendency to block within the bag, and thus prevent complete filling of the bag. If such fill goods are to be filled in bags, stripper elements are preferably provided to permit compression of the bags in longitudinal direction.

Referring to FIGS. 11-13: Two stripper elements are located below the sealing or welding jaws 40, 43 mechanically coupled to the jaws 40, 43. The stripper jaws, blades or plates 87 are spring-loaded by springs 89, positioned with the housing 85 for the jaws or plates 87. The stripper jaws or plates 87, thus, travel both horizontally as well as vertically together with the sealing jaws 40, 43.

FIGS. 14 and 15 show such stripper means with more details. The stripper blade or plate 87 is movably arranged in the housing 85, comprising two cover plates 123 and 124 and an intermediate member 131 secured by bolts 126. Between the rear side of the stripper plate 87 and the intermediate member 131 a plurality of springs 89 are arranged. A bore 134 extends in longitudinal direction at the forward end of the stripper plate 87, having a plurality of upwardly directed small openings 136. The bore 134 is connected with a tube 140 for conducting compressed air. The movement of the spring loaded stripper plate 87 is limited by a step 128. In accordance with a feature of the invention, the air jets are provided for cooling the bottom seal of the tube just after opening of the jaws 40, 43. Holding elements for fixing the stripping members to the jaws 40, 43 are well known in structure design, have been omitted for clarity from the drawing.

When the jaws 40, 43 are open—see FIG. 11—the fill goods 95, in accordance with a previously weighted quantity, are located in the tube 20 closed off by the bottom seal 21 positioned between the stripper plates 87.

To start the stripping process, the sealing jaws 40, 43 are moved towards each other—see FIG. 12—upon operation of the cam disk 76, a crank arm, or the like, as described in detail above in connection with FIGS. 7 and 8. The two sealing jaws 40, 43, however, will be spaced from each other in advance of engagement of the stripper plates 87 against the respective walls of the tube 20, then forming the bag 54. Initially, thus, no sealing proces will start. The stripper plates 87 will engage and pinch, not completely closed for discharging air, against the tube 20, causing the springs 89 to be compressed. In the position in which the stripper plates 87 have engaged the tube, downward movement of the jaws 40 will occur, together with the stripper plates 87. The downward movement, if this embodiment is used, is controlled to be considerably faster than the continuous feed movement of the tube 20. This compresses the articles of goods 95 within the tube 54 downwardly. Under control of the cam 76, or equivalent control, the sealing jaws will then close completely and the previously described sealing process to form the sealing 17 of the bag 54 is carried out, as best seen in FIG. 13. During this operation, the two stripper plates 87 are almost engaged against the tube 20. The severing knife 72 is then operated by the piston 74. The bag, closed at the top and bottom, is severed. As described, the sealing process is carried out during the continuous movement of the tube, the sealing jaws 49, 43 then operating at the same speed as the feeding speed of the tube 20, in downward direction. Since, simultaneously with the top seal of a lower bag, the bottom seal of the next upper bag is formed, fill of the upper bag by fill goods 95 can be started as soon as the seal jaws have completely closed.

The seal jaws 40, 53, and with them the stripper plates 87, are opened after the knife 74 has severed the bag 54 from the upper, still open bag portion, and the entire system 56, together with the jaws 40, 43 and the stripper plates 87, is raised upwardly and with increased speed, so that it will be available to start the next stripping, sealing and severing cycle, that is, in the starting position shown in FIG. 11.

Differential speed in vertical direction, arrow F (FIG. 1) of the entire system 56, including the jaws 40, 43 and the stripper plates 87, can be easily controlled by controlling the speed of the motor 58 by suitable programmed control of an electrical movement of the jaws 40, 43 and with them of the stripper plates 87. Opening and timing is controlled by control of the associated motor 62, or by a suitable cam track on the cam disk 76.

Various changes and modifications may be made in the mechanical and structural arrangement of the apparatus. For example, rather than using the rollers 25 to draw the tube 20 downwardly over the fill tube 13, belt system or other draw down arrangements may be used. A belt system is shown, for example, in the referenced U.S. Pat. No. 4,288,965.

Figure 9:
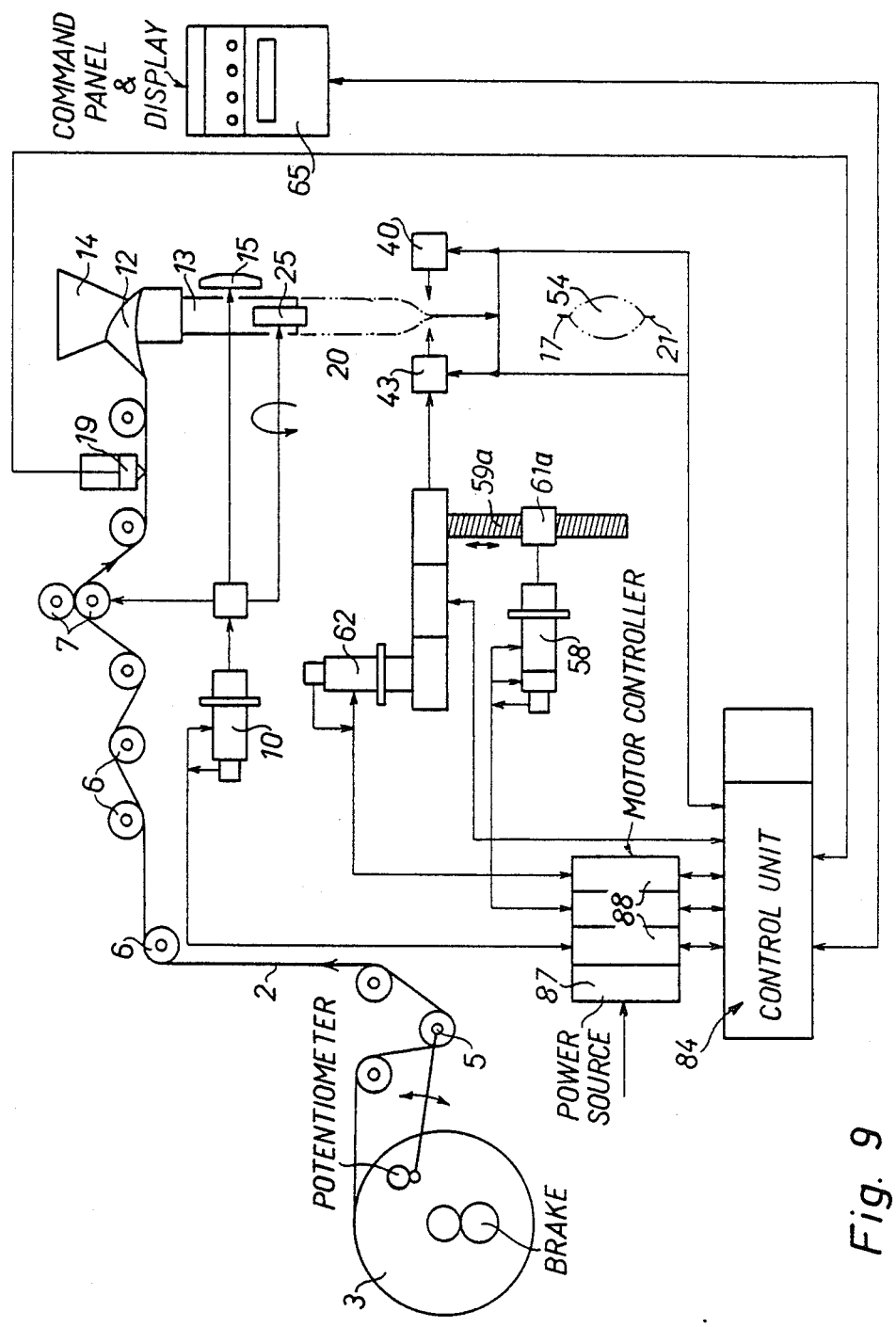
FIG. 9 is a schematic drawing of the operation system of the machine, illustrating electrical connection.
Figure 10:
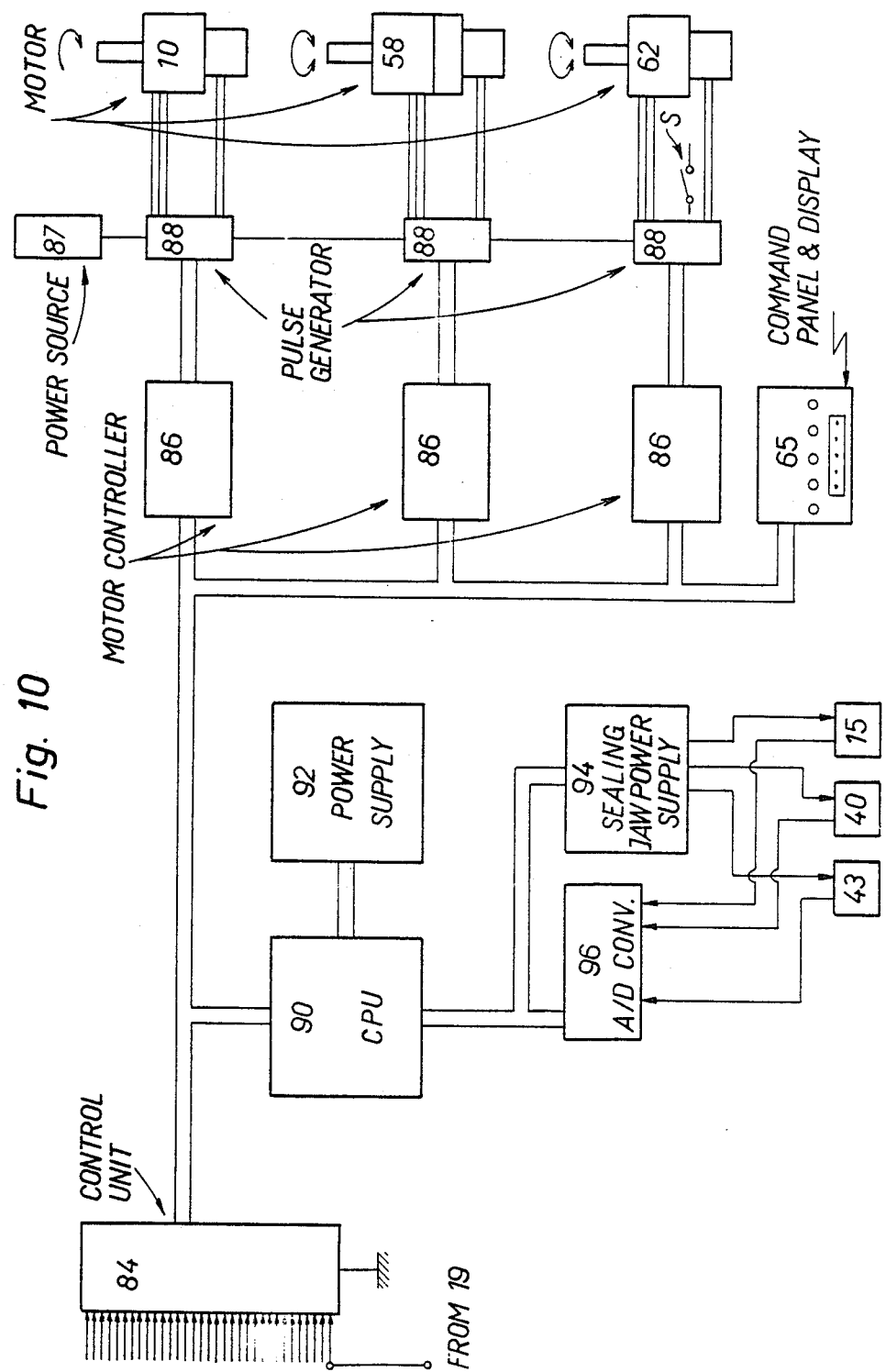
FIG. 10 is a block diagram of the control system of the machine.

Synchronized operation of the various elements of the overall feeding system is controlled by an electrical control system, shown in detail in FIGS. 9 and 10.

The drive roller pair 7 continously removes the film 2 from the film reel 3. The motor 10, which is a servo motor or a stepping motor, is speed-controlled by a control unit 84, which controls motor controllers or control unit 88 associated with the individual motors. A motor power supply or power source 87 provides the necessary operating power.

The motor controller may be a driver circuit. A sensor 19 which, preferably, is a photo cell, for example a photo transistor or other photosensitive element, is located between the pair of drive rollers 7 and the former 12. The sensor 19 responds to differences in brightness or whether an element is transparent or opaque and, thus, responds to the marks 53 shown in FIG. 16. Rather than providing marks on a film web, perforations or other indicia of position of a specific transverse portion of the film can be used. The space between two markers 53 correspond to a predetermined space associated with each other of the bags 54; of course, a plurality of markers may correspond to any such length, and the number of markers which are to be used on any one bag can be varied, as desired. Upon change of the length of the package, it is a simple matter to provide for match of the markers signals sensed by the sensor 19 to the requisite package length, by digitally processing the time interval between succeeding markers, in relation to a fixed clock or signal frequency, and in relation to the linear speed of the film web, which can be readily determined from the rotary speed of the drive roller pair 7 together with the diameter thereof.

The length increments between two markers 53 correspond to a predetermined number of pulses, signals or rotary incremental steps or angular rotation carried out by motor 10. If motor 10 is a servo motor operating in analog mode, the length increments will control the rotary angle through which the servo motor will turn; if the motor 10 is a stepping motor, the length between two markers 53 will determine the number of steps, and hence the entire angular rotation of the motor.

The step or pulse number which the motor should carry out to feed the film to provide the packages of predetermined length is calculated and/or computed by a computer (CPU) 90 (FIG. 9) with the number of pulses which occur in the period of time between scanning of two adjacent markers 53 by the photo cell 19. Upon deviation of the scanned or actual pulse number from a command or preset value, the motor controller 86 is controlled to either suppress pulses so that the motor will run slower, or increase the number of pulses to increase the motor speed. The corrected values are supplied to motors 58 and 62 as well as to servo motor 10, so that the motor will operate in synchronism. The term "synchronism" as used herein is to be understood that the motors operate in synchronous relationship with respect to each other; the individual speed in revolutions of angular deflection of each motor, per unit time, need not be the same; rather "synchronous relationship" means that if the speed of the motor 10 changes, the speed or angular rotation per unit time of the motors 58 and 62 changes in proportion.

The longitudinal seal generated by the longitudinal sealing jaw 15 is shorter than the length of the packages. Thus, the stroke per unit time or the rhythm or cadence of operation of the longitudinal jaw 15 must be substantially faster than the stroke time or cadence of operation of the transverse sealing jaw 40, 43 or, respectively, of the entire system 56.

The control system provides for synchronized, conjoint operation in vertical direction of the jaw 15, in cadence with feed of the film and hence of the tube 20, as well as for opening and closing movement of the jaws 40, 43 during the sealing and welding which, in turn, is in synchronism and cadence with the separating distance defining the length of the packages and, also with the spacing between sequential markers 53. Inaccuracies in feed of the film, for example due to slippage of the film, tolerances in film thickness and the like, thus cannot become additive, and are immediately corrected within the inertia of the system, which is small. The motors 58, 62, each, have a motor controller 86 and a pulse generator 88 connected thereto, the pulse generators 88 providing the operating pulses for the motors 58, 62 which, preferably, are servo motors—see FIG. 10. The sealing jaws 15, 40, 43, shown only schematically in FIG. 10, are each supplied from a sealing jaw power supply unit 94 and their relative temperature are scanned and supplied to an analog/digital convertor 96. The output is fed back digitally to the CPU 90 to form a close lapp.

The input of control unit 84 and CPU 90 preferably, are a microcomputer suitable programmed to carry out the respective operating functions. A command panel and display unit 65 provides for data input into the input or control unit 84, and display of, respectively, the data being into the input or control unit 84 and, thereafter, continued display of operating characteristics of the unit, to provide for monitoring of the respective elements.

In one embodiment, the unit 84 is an opto-isolated digital input unit, with analog/digital conversion capability, if needed, and receives, among other inputs, the input from sensor 19. Clock pulses are provided by the CPU 90 which can be in form of a supervisory control unit of the type INTEL 8086, with its own clock source. Power supply 92 is conventional, for the control unit type 8086. The connection between the control unit type 8086 and all the other electrical and electronic components can be by means of an SMP bus. The motor controllers 86 can take the form of control units INTEL 8049 or 8085, respectively, depending on power requirements. The control panel and display can be keyboard and display unit 8085, and matched to the respective motor controls. By suitably programming control unit 84, 90, the speed of the jaw closing of the sealing jaws 40, 43 and the timing thereof can be controlled in time relation to the vertical movement of the system 56, as described in connection with FIGS. 11-13. The unit 84 and CPU 90 controlled by the command panel 65 can be programmed as well known in connection with timing sequences and comparison technology.

Rather than making heat seals, welding seals can be made on the packages, both in longitudinal as well as in transverse direction, depending on the material of the film to be used. The jaws 15, 40, 43, thus, can be adapted, as desired, to the material and may be either sealing jaws for heat sealable material or welding jaws for thermoplastic materials.

The connection between the respective pulse generators 88 and the motors 10, 58, 62 is illustrated merely in the form of five lines, although, of course, more or fewer numbers of lines can be used. The motors 58 and 62 are reversible; motor 10, which drives the feed of the film by driving the drive roller pair 7 and the drawdown mechanism 25 and longitudinal seal bar need operate only in one direction.

The motors 58, 62 are reversible-type motors to provide, respectively, for reciprocating vertical movement of the jaw pair 40, 43 and for opening and closing, respectively, of the jaws 40, 43. The control units can, additionally, control other parameters used in making the bags, for example the pressure of the jaws 40, 43 with respect to each other, as explained in greater detail in the referenced application Ser. No. 06/830,641, filed Feb. 18, 1986, KLINKEL, now U.S. Pat. No. 4,713,047.

Various changes and modifications may be made, and features described in connection with any one of the embodiments may be used with any of the others, within the scope of the inventive concept.

We claim:

1. Vertical form-fill-seal packaging apparatus comprising
   a supply roll (3) of a continuous flat, flexible film (2),
   a former (12) receiving said film and deforming said film into a downwardly extending tubing with lateral longitudinal edge portions overlapping each other;
   means (15) for sealing or welding said edge portions (20a, 20b) of the film, while in tubular form, to form a longitudinally closed tube (20) with a vertically extending longitudinal seal (16);
   means (25) for drawing said film continuously over said former (12) and maintaining it in taut condition;
   said sealing or welding means (15) comprising a longitudinal sealing or welding jaw (15) for forming said longitudinal vertical seal on said tubing during continuous movement thereof;
   jaw drive means (70) for moving said jaw in a straight path parallel to and in a direction of movement of said film edge portions with the speed of feed of said film (3) during sealing of the edge portions and removing said jaw from said film edge portions after sealing and moving said jaw counter the direction of movement of said film edge portions;
   a pair of cross-sealing means (40, 43) for forming two spaced cross seals across said tubing, located downstream of said jaw;
   means (62, 76, 80, 82) for moving said cross sealing means (40, 43) between an open position and a closed position diametrically across said film tubing (20);
   sealing drive means (58, 59) for moving said cross-sealing means (40, 43) longitudinally with the film tube (20) upon closing of said cross sealing means on the film tube, and for repetitively moving said cross-sealing means in a return path out-of-engagement with said tubing and counter the continuously feeding direction of said tubing (20);
   means (14) for filling the tubing in downward direction between successive cross seals and during downward movement of the tubing; and
   means (72) for severing a filled tube portion from the closed tube by engagement of a severing knife (72) between said spaced cross seals.

2. Vertical form-fill-seal packaging apparatus comprising
   means for forming flexible packaging material into a downwardly extending tubing;
   means for feeding the tubing downwardly at a first continuously downward feeding speed;
   means for longitudinally sealing the tubing;
   means for cross-sealing the tubing at package length intervals;
   means for filling the tubing with material between successive cross seals;
   said cross sealing means comprising
   a pair of sealing members (40; 43);
   seal moving means for moving said cross-sealing members relative to one another between an open position clear of the tubing and a fully closed position in sealing engagement with the tubing;

stripper members (87) movable relative to one another from an open position to a closed position in engagement with and squeezing the tubing;

and means for moving said stripping means up and down relative to the tubing, wherein said stripper members comprise housing means and stripper plates movable radially with respect to said tubing, said housing means being fixed positioned adjacent and below said cross sealing means;

said means for moving said stripper members up and down being coupled to said cross-sealing means for conjoint movement said stripper member moving means moving the stripper members and the cross-sealing means conjointly in a continuously downward direction, first at a second speed in excess of said continuous feeding speed of said tubing to squeeze the tubing between said stripper members and to compact said material within said tubing in advance of sealing engagement of said cross sealing means with said tubing, and then, at the end of a stripping path, said means for moving said stripper members and cross-sealing means move with said first speed, said seal moving means then moving said cross-sealing members in the fully closed sealing position and the stripper plates simultaneously into a tubing squeeze position;

means for controlling the cross sealing members to effect a cross seal during continuous movement of the tubing and the cross-sealing members at said first speed;

said means for conjoint movement of said stripper members and cross-sealing members and said seal moving means then moving said members in open position and in a path out-of-engagement with said tubing and in a direction counter the feeding direction of said tubing.

3. Method for form-filling and sealing packaging of articles including providing a flat flexible film (2) having longitudinal spaced markers (53);

continuously positively feeding the flat film (2) to a former by a continuously moving feeding means (7, 10), and passing the flat flexible film around the former (12) to deform and shape the flat film into tubular shape, in which lateral edge portions (20a, 20b, 20c) of the film will be located adjacent each other;

connecting the longitudinal edge portions of the film while in tubular shape to form a closed tube with a vertical longitudinal seal (16);

forming two spaced transverse cross seams (17, 21) across the closed tube by sealing or welding means (40, 43) at package length;

filling the tube after having been cross-sealed by one of said seams;

severing the tube between the cross seams, and comprising the steps of sequentially engaging a longitudinal sealing or welding jaw (15) against the longitudinal edge portions of the moving film to thereby connect the longitudinal edge portions, and repetitively moving said longitudinal sealing jaw in a straight path portion in engagement with said edge portions of the moving film to seal the edge portions by continued engagement with the film during its downward movement, and further moving said sealing jaw in a return path portion out-of-engagement with said edge portions and counter the feeding direction of said tube (20);

continuously positively exerting a drawing force on the closed tube (20) by continuously drawing the closed tube downwardly over the former at a constant speed during formation of said longitudinal seal;

filling the tube with a quantity of said articles, downwardly by gravity, and with which the packages are to be filled during the downward movement of said tube;

moving a pair of sealing or welding means (40, 43) relative to one another between an open and a closed position to form said transverse seams (17, 21) and, when in closed position, additionally moving said sealing or welding means in vertical direction along a straight path at the same speed as the speed of the moving tubing;

repetitively moving the sealing or welding means, when in open position, in a return path out-of-engagement with said tubing and counter the feeding direction of said tubing;

scanning the spaced markers (53) on the film, as it is being continuously fed, by a scanning means (19);

comparing the time of passage of sequential markers past a scanning point with a predetermined command reference value;

and controlling, in synchronized relation:

the feeding speed of the film during the feeding steps;

the movement speed of the sealing means;

the formation of the cross seals, to conform to said predetermined command reference value, to thereby control, in synchronized relation:

the movement of the feeding means (7, 10);

the movement of the welding jaw (15); and the sealing or welding operation of the sealing or welding means (40, 43), to compensate for deviation between feed of the film by said feeding means and movement and sealing operation of said sealing means.

4. The method of claim 3, wherein said scanning step comprises scanning movement of the film at a location upstream—with respect to movement of the film—of a tube draw down means (25).

5. The method of claim 3, including the step of positively feeding the flat film to said former (12) by a positive feed drive (7).

6. The method of claim 3, wherein said scanning step is carried out at a location between said positive feed drive (7) and a tube draw down means (25).

7. The method of claim 3, including the step of (FIGS. 11-13) pinching the tube (20) just in advance of cross-sealing or welding the tube by stripping plate means (87), and moving said stripping plate means longitudinally with the tube being pinched during said stripping operation;

and wherein said step controlling synchronized relation of speeds includes controlling the speed of movement, along the tube, of said stripping plate means at a longitudinal speed which is higher than the feeding speed of the tube to compress fill contents within the tube.

8. The method of claim 3, wherein said comparing step comprises comparing the time of passage of sequential markers past said scannning means with a predetermined time interval;

and said controlling step comprises varying, in synchronized relation, the movement speed of the sealing means, the formation of the cross seam of seal, and the speed of the feeding means in sign and magnitude in dependence on deviation between the time of passage of sequential markers and said predermined interval.

9. The method of claim 3, wherein the step of forming the longitudinal seal (16) comprises providing the sealing or welding jaw (15) with a longitudinal extent shorter than the length of any package to be formed from the tube (20);

and repetitively moving the sealing jaw in an approximately elliptical path in a path portion in engagement with said edge portions to seal the edge portions and in a return path portion out-of-engagement with said edge portions and counter the feeding direction of said tube (20), the longitudinal dimensions of said sealing jaw being longer than said approximately elliptical path to provide for a continuous longitudinal overlapping seam along the edge portions of said tube.

10. The method of claim 9, wherein said controlling step includes controlling, in synchronized relation, additionally, the movement of said longitudinal sealing jaw (15) in said at least approximately elliptical path, and in synchronized relation with respect to the feed speed of the tube.

11. A method for form-fill-seal and package articles including forming a flexible packaging material into a downwardly extending tubing, continuously, positively feeding said tubing in continuous movement with a constant first speed in a downward direction, forming a longitudinal seal on said tubing during said continuous movement of said tubing;

filling the tubing downwardly with a quantity of the articles with which the packages are to be filled;

transversely sealing the tubing at package length, the transverse seals being formed by a pair of sealing members (40, 43) movable relative to one another between an open and a closed position, and, when the sealing members are in closed position, moving said sealing members in a straight path in vertical direction with the same first speed of the tubing to thereby form a vertical seal, and when the sealing members are in open position and after delivery of the articles into the tubing and before a next seal is made, squeezing the tubing below the sealing members by positively moving a pair of stripper members (87) and operatively connected with said sealed members (40, 43) and closely adjacent relative to one another on opposite sides of the tubing into a closed position;

moving simultaneously said pair of sealing members into a position adjacent one another but slightly spaced in a non-sealing relation to the tubing, holding the stripper members in their closed position while moving them generally straight downwardly along the tubing together with the slightly spaced sealing members with a second speed which is higher than said first speed and upon downward movement of said tubing, to thereby compress the product in the tubing below the level of the next seal to be made;

reducing the vertical speed of said operatively connected sealing members and said stripper members to said first speed and fully closing the sealing members on the tubing above the stripper members for forming said transverse seals during movement of the tubing with said first speed;

cutting said sealed package; and then opening the stripper members and the sealing members and moving the stripper members together with the sealing members to their open position, and further counter the direction of movement of the tubing for return to a starting position.

12. Vertical form-fill-seal packaging apparatus having means (3) for providing a continuous, flat, flexible film (2) having spaced markers (53) thereon;

a former (12) receiving said flat, flexible film and deforming said flat, flexible film into tubular shape, with lateral edge portions of the flat film located adjacent each other;

means (15) sealing or welding the longitudinal edge portions (20a, 20b) of the film, while in tubular form, to form a longitudinal closed tube (20) with a longitudinal seal (16);

cross-sealing means (40, 43) for forming two spaced cross seals (17, 21) across the closed tube (20);

means (14, 13) for filling the tube after having been cross-sealed by one of said cross seals;

means (72) for severing a filled tube portion from the closed tube by engagement of a severing knife (72) between said spaced seals;

wherein the film (2) is formed with longitudinally spaced markers (53);

and said apparatus further comprises continuously operating positive feeding means (7, 25) for feeding the film to the former (12) and pulling the then formed tube (20) from the former;

a forming tube (13) positioned downstream—with respect to movement of said film—of said former (12) for shaping and wrapping the film into said tubular shape, said continuously positive feeding means comprising means (25) for engaging the film as it is wrapped about said forming tube (13) and maintaining said film in taut condition, said engaging means exerting a pulling force on said film, a sealing means drive means (58, 59) for continuously moving the sealing means (40, 43) as the film is being fed to the former;

said means for connecting, sealing or welding the longitudinal edge portions (20a, 20b, 20c) of the film and forming said longitudinal seal (16) comprising a connecting, sealing or welding jaw (15), and jaw drive means (70) moving said jaw in a elliptical path (18) having a vertical component substantially parallel to and in the direction of movement of said film edge portions with the speed of feeding of said film (2) and another component, removed from said film edge portion;

means (62, 76, 80, 82) for moving said cross sealing means (40, 43) between an open position and a closed position and diametrically across said film tubing (20), drive means (58, 59) moving said cross sealing means (40, 43) longitudinally with the film in a straight path at the vertical downward feeding speed of said film tube (20) upon closing of said cross sealing means with the film tube and repetitively moving said cross sealing means in a return path out-of-engagement with said tubing and counter the continuously feeding direction of said tubing (20);

a scanning means (19) positioned at a predetermined location in said apparatus and in scanning alignment with said markers (53) on the film, for scanning the markers as the film is moved past the scanning means;

and control means including comparator means (84, 90, 86, 88, 65) coupled to said scanning means and said continuous positive film feeding means, said sealing means drive means (58, 60) and said cross-sealing means (40, 43) and controlling movement of all said connected means, in synchronous relation, as a function of comparison of the spacing of sensed marker with respect to a predetermined command interval, wherein said comparator means compares the time interval between sensing of said spaced markers by said sensing means;

and wherein the operating speed of said jaw drive means is controlled by said control means.

13. The apparatus of claim 12, wherein said engagement means comprises a driven element (25) engaging the film as it is wrapped about said forming tube (13), said driven element being driven from said feeding means at a circumferential speed which is slightly higher than the speed of feeding of said film (2);

and a slip clutch (36) is provided, interposed between the driven element and said feeding means to permit slippage between said driven element and the feeding means.

14. The apparatus of claim 12, wherein the means for connecting, sealing or welding the longitudinal edge portions (20a, 20b, 20c) of the film and forming said longitudinal seal (16) comprises a connecting, sealing or welding jaw (15), and jaw drive means (70) moving said jaw in an approximately elliptical path (18) having a vertical component substantially parallel to and in the direction of movement of said film edge portions with the speed of feeding of said film (2) and another component, removed from said film edge portion and counter the direction of movement of said film edge portion;

said sealing or welding jaw (15) having a longitudinal extent shorter than the length of any package to be formed from the tube (20) longitudinal against said edge portion (20a, 20b, 20c);

the longitudinal dimensions of said sealing jaw being longer than said aproximately elliptical path to provide for a continuous longitudinal overlapping seam along the edge portions of said tube;

and wherein the operating speed of said jaw drive means is controlled by said control means.

15. The apparatus of claim 12, further including a stepping or servo motor (10) coupled to said jaw drive means, and to said means for positively feeding the film (2), said motor being connected to and controlled by said control means.

16. The apparatus of claim 12, wherein said control means includes a clock (90) providing a sequence of pulses;

pulse-controlled motor means (10) coupled to and forming part of said continuous film feeding means (7,25);

pulse-controlled cross sealing motor means (62) coupled to and operating the cross-sealing means (40, 43);

and pulse-controlled sealing drive motor means (58);

and wherein said control means is connected to all said motor means and, respectively, controls the pulse rates of pulses applied to the respective motor means as a function of comparison of the sensed spacing of markers or number of counts with said command interval.

17. The apparatus of claim 12, wherein the means for connecting, sealing or welding the longitudinal edge portions (20a, 20b, 20c) of the film and forming said longitudinal seal (16) comprises a connecting, sealing or welding jaw (15), and jaw drive means (70) moving said jaw in an approximately elliptical path (18) having a vertical component substantially parallel to and in the direction of movement of said film edge portions, and another component, removed from said film edge portion and counter the direction of movement of said film edge portion;

wherein the operation speed of said jaw drive means is controlled by said control means;

and wherein the jaw drive means comprises a multiple bar linkage (70) including a rotatable crank (118), driven in synchronized relation under control of said control means; and a pivotable mounted lever (122) having one end coupled to said crank (118), another end coupled to said jaw (15) and an intermediate pivot point movably coupled to a link (124), said link having a fixed pivot point located remove from a coupling connection of said link with said lever (122).

18. The apparatus of claim 12, further including stripping means (85, 87) positioned adjacent said cross-sealing or welding means (40, 43, and operatively connected to said stripping means and said sealing or welding jaws (40,43) for conjoint movement in vertical and horizontal direction, and including a housing (85) and stripping elements (87) movable radially inwardly with respect to said tube (20) formed of said film, and further movable longitudinally with respect to said film at a speed in excess of the continuous feeding speed of said film to squeeze the tubing between said stripping elements and compact material within said tube.

19. The apparatus of claim 18, wherein said cross-sealing means comprise sealing or welding jaws (40, 43) and means (62, 76, 82, 80) for moving said sealing jaws towards each other, and diametrically across said film tube (20);

and wherein said housing is fixedly coupled to said sealing jaws, projecting radially inwardly beyond said sealing jaws (40, 43) to engage with and squeeze the tube (20) below said sealing jaws in advance of sealing engagement of the sealing jaws with the tube (20).

20. The apparatus of claim 19, further including a motor drive means (58, 59) forming part of said means for continuously moving the sealing means as the film is being fed to the former, said motor drive means driving said stripping plates longitudinally with respect to the film at a speed faster than the speed with which the film is being continuously fed to compact goods within the bag, in advance of sealing or welding of the tube by said sealing or welding jaws (40, 43), and said motor drive means moving the sealing jaws longitudinally with respect to the film at the speed of feed of said film tube (20) upon engagement of said sealing with the film tube.

21. The apparatus of claim 19, wherein
said stripping elements are formed with perforations adjacent surfaces thereof engaging the film;
and compressed air is being supplied to the interior of said stripping elements to escape from said perforations and cool the seal (17, 21) being made by said sealing or welding jaws.

22. Vertical form-fill-seal packaging apparatus having a supply roll (3) of flat, flexible film, wherein the film (2) is formed with longitudinally spaced markers (53);
means for forming said film into a downwardly extending tubing,
first transport means (7) for continuously drawing said film from said supply roll (3);
second transport means (25) for drawing said material continously over a former (12), and at sufficient tension to maintain it taut and at a predetermined downward speed;
means (15) for forming a longitudinal vertical seal on the tubing during continuously moving said tubing, and said forming means comprising a jaw and drive means for said jaw to move it in a straight path parallel to the feeding movement of said tubing;
a pair of cross-sealing means (40, 43) for forming cross seals across said tubing,
first drive means (62, 76, 78, 82) for moving said cross-sealing means (40, 43) between an open position and a closed position,
second drive means (58, 59) coupled to said cross-sealing means for continuously moving said cross-sealing means (40, 43) in vertical direction;
stripping means (85, 87) operatively associated with and coupled to said cross-sealing means (40, 43) and including stripping members (87) movable radially inwardly with respect to said tubing (20), said second drive means first moving the cross-sealing means and the stripping means longitudinally with respect to said film at a speed in excess of the continuous feeding speed of said film to squeeze the tubing between said stripping members to and compact material within said tubing;
said second drive means (58, 59), after said longitudinal movement at a speed in excess of the film speed, moving said stripping means (85, 87) in squeezed condition and said cross-sealing means in closed position at said same downward speed of said tubing for cross-sealing the tubing,
means (14) for filling the tubing between successive cross seals;
means (72) for severing a filled tubing;
means (19) for sensing the markers (53) on the film;
means for comparing the length of the film sheet between two successive markers (53) with a predetermined command length, and
a correcting device connected to and controlling at least one of said transport means (7, 25) for adjusting deviations of the film transport speed in order to prevent accumulated inaccurate feeding of the tubing.

* * * * *